(12) United States Patent
Kim et al.

(10) Patent No.: US 11,243,649 B2
(45) Date of Patent: Feb. 8, 2022

(54) METHOD AND APPARATUS FOR PROVIDING WEB BROWSING INTERFACE INCLUDING DIVIDING THE CONTENT DISPLAY REGION INTO AT LEAST TWO SPACES, AND ALLOWING SELECTION OF DIFFERENT MODES FOR LOADING WEB PAGES OT THE AT ELAST TWO SPACES

(71) Applicant: NAVER CORPORATION, Seongnam-si (KR)

(72) Inventors: Hyo Kim, Seongnam-si (KR); Yun Seok Lee, Seongnam-si (KR); Ji Ho Choi, Seongnam-si (KR); Hyo Jung Kim, Seongnam-si (KR)

(73) Assignee: NAVER CORPORATION, Seongnam-so (KR)

( * ) Notice: Subject to any disclaimer, the term of this patent is extended or adjusted under 35 U.S.C. 154(b) by 132 days.

(21) Appl. No.: 15/839,295

(22) Filed: Dec. 12, 2017

(65) Prior Publication Data
US 2018/0307379 A1  Oct. 25, 2018

(30) Foreign Application Priority Data
Apr. 24, 2017  (KR) ........................ 10-2017-0052550

(51) Int. Cl.
| G06F 3/0481 | (2013.01) |
| G06F 16/23 | (2019.01) |
| G06F 3/0483 | (2013.01) |
| G06F 16/955 | (2019.01) |
| G06F 16/954 | (2019.01) |

(52) U.S. Cl.
CPC ............ *G06F 3/0481* (2013.01); *G06F 16/23* (2019.01); *G06F 16/954* (2019.01); *G06F 16/955* (2019.01); *G06F 3/0483* (2013.01); *G06F 2203/04803* (2013.01)

(58) Field of Classification Search
CPC .............................................. G06F 2203/04803
See application file for complete search history.

(56) References Cited

U.S. PATENT DOCUMENTS

| 7,568,149 B2* | 7/2009 | Edwards ............... G06F 16/957 715/205 |
| 8,255,809 B2* | 8/2012 | Best ........................ G06F 9/451 715/749 |
| 8,373,615 B2* | 2/2013 | Chen ..................... G06F 1/1637 345/1.1 |

(Continued)

FOREIGN PATENT DOCUMENTS

KR   20100122176 A   11/2010

*Primary Examiner* — Benjamin Smith
(74) *Attorney, Agent, or Firm* — Greer Burns & Crain, Ltd.

(57) ABSTRACT

Provided is a method of providing a web browsing interface, wherein at least one tab is provided for a content display region, the method including: splitting the tab into at least two spaces based on a space mode of the tab; displaying web pages respectively in the at least two spaces; while the tab is split into the at least two spaces, determining whether the space mode of the tab is a first mode or a second mode; when the space mode is determined to be the first mode, performing a first mode setting operation of setting one of the at least two spaces as a main space, setting a margin on a periphery of the main space, and displaying a web page in a region of the main space excluding the margin.

15 Claims, 13 Drawing Sheets

(56) References Cited

U.S. PATENT DOCUMENTS

| | | | | |
|---|---|---|---|---|
| 9,310,834 B2* | 4/2016 | Selim | | G06F 3/04886 |
| 10,025,463 B2* | 7/2018 | Shearer | | H04L 12/2803 |
| 10,289,296 B1* | 5/2019 | Zhang | | G06F 40/14 |
| 2002/0054141 A1* | 5/2002 | Yen | | G09G 5/14 |
| | | | | 715/804 |
| 2003/0204815 A1* | 10/2003 | Edwards | | G06F 16/957 |
| | | | | 715/205 |
| 2004/0128294 A1* | 7/2004 | Lane | | G06Q 30/02 |
| 2004/0162800 A1* | 8/2004 | Reid | | G06Q 30/02 |
| 2006/0224951 A1* | 10/2006 | Burke | | G06F 16/957 |
| | | | | 715/234 |
| 2007/0112759 A1* | 5/2007 | Kulakow | | G06F 16/338 |
| 2008/0065237 A1* | 3/2008 | Long | | G06F 16/951 |
| | | | | 700/3 |
| 2010/0002138 A1* | 1/2010 | Chen | | G06F 3/0481 |
| | | | | 348/564 |
| 2011/0265002 A1* | 10/2011 | Hong | | G06F 3/04855 |
| | | | | 715/702 |
| 2011/0302234 A1* | 12/2011 | Monk, IV | | H04L 65/80 |
| | | | | 709/203 |
| 2012/0278703 A1* | 11/2012 | Best | | G06F 9/451 |
| | | | | 715/240 |
| 2013/0002568 A1* | 1/2013 | Selim | | G06F 1/1643 |
| | | | | 345/173 |
| 2013/0187861 A1* | 7/2013 | Lavallee | | G06F 9/543 |
| | | | | 345/173 |
| 2014/0095583 A1* | 4/2014 | Houle | | G06F 17/2247 |
| | | | | 709/203 |
| 2014/0096042 A1* | 4/2014 | Travis | | G06F 3/0484 |
| | | | | 715/760 |
| 2014/0229888 A1* | 8/2014 | Ko | | G06F 3/04842 |
| | | | | 715/783 |
| 2014/0337794 A1* | 11/2014 | Vranjes | | G06F 3/0481 |
| | | | | 715/800 |
| 2015/0082225 A1* | 3/2015 | Shearer | | G06F 3/04886 |
| | | | | 715/771 |
| 2015/0199308 A1* | 7/2015 | Cooper | | H04L 65/403 |
| | | | | 715/235 |
| 2016/0124924 A1* | 5/2016 | Greenberg | | G06F 17/2247 |
| | | | | 715/738 |
| 2016/0239203 A1* | 8/2016 | Sato | | G06F 3/1423 |
| 2017/0060812 A1* | 3/2017 | Williams | | G06F 17/212 |
| 2017/0357437 A1* | 12/2017 | Peterson | | G06F 3/0486 |
| 2019/0235720 A1* | 8/2019 | Zhang | | G06F 3/0485 |

* cited by examiner

FIG. 7

METHOD AND APPARATUS FOR PROVIDING WEB BROWSING INTERFACE INCLUDING DIVIDING THE CONTENT DISPLAY REGION INTO AT LEAST TWO SPACES, AND ALLOWING SELECTION OF DIFFERENT MODES FOR LOADING WEB PAGES OT THE AT ELAST TWO SPACES

CROSS-REFERENCE TO RELATED APPLICATION

This application claims priority under 35 U.S.C. § 119 to Korean Patent Application No. 10-2017-0052550 filed on Apr. 24, 2017, in the Korean Intellectual Property Office, the entire contents of which are incorporated herein by reference.

BACKGROUND

1. Field

One or more embodiments relate to methods and apparatuses for providing a web browsing interface, and more particularly, to a method and apparatus for providing a web browsing interface, which respectively displays web pages on split spaces and sets a margin on a periphery of a main space based on a space mode.

2. Description of the Related Art

This section provides background information related to the present disclosure which is not necessarily prior art.

A web browser is an application program for searching for and using information on the Internet. The web browser is also referred to as a browser or an Internet browser. Users are able to do various activities, such as watch a video, exchange emails, and upload or download various types of data through the web browser. General functions of the web browser include opening a web page, providing a recently visited uniform resource locator (URL) or a bookmark, and storing a web page.

SUMMARY

This section provides a general summary of the inventive concept, and is not a comprehensive disclosure of its full scope or all features of the inventive concept.

One or more embodiments include setting a margin on a periphery of a main space based on a space mode, in a web browsing interface capable of respectively displaying web pages on split spaces.

One or more embodiments also include determining an active page from among web pages based on a space mode, and setting an index of a tab or a uniform resource locator (URL) emphasis mark based on information of the active page, or setting an active mark on a space including the active page based on a space mode.

Additional aspects will be set forth in part in the description which follows and, in part, will be apparent from the description, or may be learned by practice of the presented embodiments.

According to one or more embodiments, a method of providing a web browsing interface, wherein at least one tab is provided for a content display region, the method includes: splitting the tab into at least two spaces based on a space mode of the tab; displaying web pages respectively in the at least two spaces; while the tab is split into the at least two spaces, determining whether the space mode of the tab is a first mode or a second mode; when the space mode is determined to be the first mode, performing a first mode setting operation of setting one of the at least two spaces as a main space, setting a margin on a periphery of the main space, and displaying a web page in a region of the main space excluding the margin.

In the performing of the first mode setting operation, when an input of selecting a link in the web page displayed in the main space is received, a web page corresponding to the link is loaded in a space other than the main space.

The method may further include, when the space mode is determined to be the second mode and an input of selecting a link in a web page displayed in a particular space from among the at least two spaces is received, performing a second mode setting operation of loading a web page corresponding to the link in the particular space.

In the performing of the second mode setting operation, an active mark may be provided to a space including an active page from among the at least two spaces.

The active mark may be a shadow effect set outside the space including the active page.

The method may further include performing an active page determining operation of determining an active page from the web pages displayed respectively in the at least two spaces, and setting an index of a tab or a uniform resource locator (URL) emphasis mark based on information of the active page.

In the performing of the active page determining operation, a web page that received a most recent input from a user, from among the web pages displayed respectively in the at least two spaces, may be set as the active page.

The first mode or the second mode may be set by a user input of selecting a toggle key provided on a web browser.

The displaying of the web pages may include displaying a scroll bar processed to be translucent so as to overlay on the web pages displayed respectively in the at least two split spaces, wherein the scroll bar may be set to be enlarged or may be set such that transparency is decreased when a user input is detected with respect to the scroll bar.

The displaying of the web pages may include: displaying, between the at least two spaces, a dividing line whose location is adjusted according to a user input; and when a size of a particular space is decreased by adjusting the dividing line, correspondingly decreasing a margin of a web page displayed in the particular space before hiding in part content of the web page.

According to one or more embodiments, a computer program is stored in a non-transitory computer-readable recording medium to execute the method.

According to one or more embodiments, a apparatus for providing a web browsing interface, wherein at least one tab is provided for a content display region, the apparatus includes: a space splitter configured to split the tab into at least two spaces based on a space mode of the tab, and display web pages respectively in the at least two spaces; a mode determiner configured to, while the tab is split into the at least two spaces, determine whether the space mode of the tab is a first mode or a second mode; and a first mode setter configured to, when the space mode is determined to be the first mode, set one of the at least two spaces as a main space, set a margin on a periphery of the main space, and display a web page in a region of the main space excluding the margin.

BRIEF DESCRIPTION OF THE DRAWINGS

Example embodiments will be described in more detail with regard to the figures, wherein like reference numerals refer to like parts throughout the various figures unless otherwise specified, and wherein:

FIGS. 7 through 11 illustrate examples of graphical user interfaces (GUIs) of web browsers according to embodiments.

Figure 1:
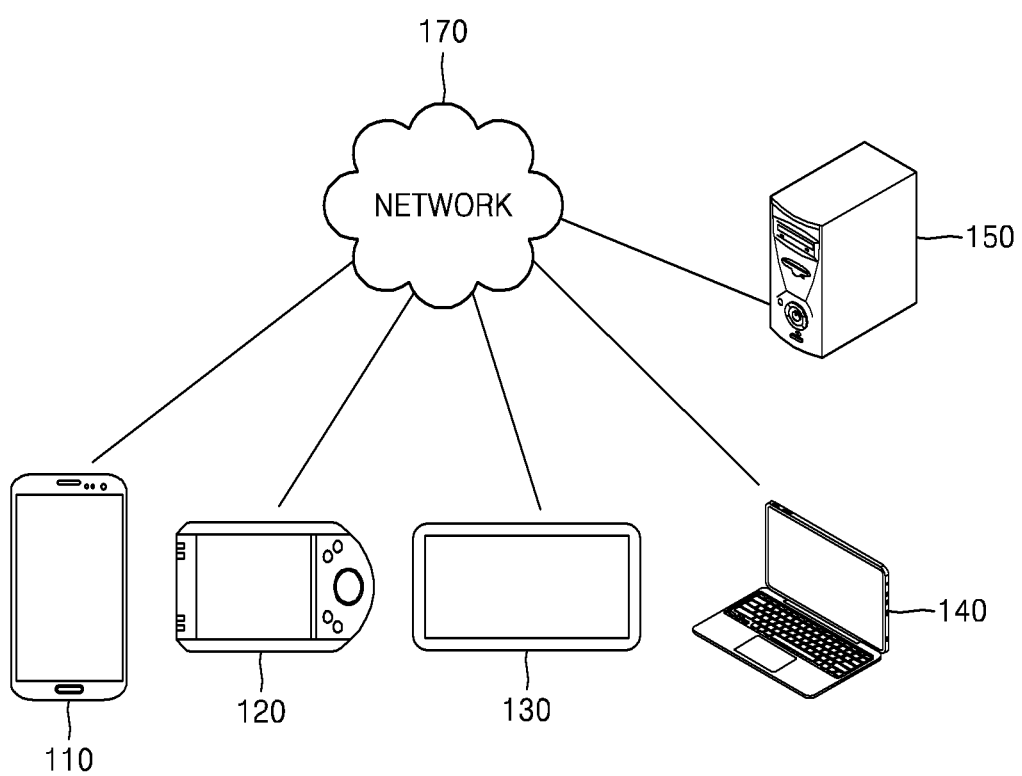
FIG. 1 illustrates an example of a network environment according to an embodiment.

It should be noted that these figures are intended to illustrate the general characteristics of methods and/or structures utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by the example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those of ordinary skill in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element, there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flowcharts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a processor, a central processing unit (CPU), a controller, an arithmetic logic unit (ALU), a digital signal processor, a microcomputer, a field programmable gate array (FPGA), a system-on-chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, a CPU, a controller, an ALU, a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording media, including tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such a separate computer readable storage medium may include a universal serial bus (USB) flash drive, a memory stick, a Blu-ray/DVD/CD-ROM drive, a memory card, and/or other similar computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other similar medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one of ordinary skill in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different to that of the methods described, and/or components such as the described system, architecture, devices, circuit, and the like, may be connected or combined to be different from the above-described methods, or results may be appropriately achieved by other components or equivalents.

FIG. 1 illustrates an example of a network environment according to an embodiment.

The network environment of FIG. 1 includes a plurality of user terminals (110, 120, 130, and 140), a server 150, and a network 170. However, the network environment of FIG. 1 is only an example, and the number of user terminals and the number of servers are not limited to those of FIG. 1.

The plurality of user terminals 110, 120, 130 and 140 may each be a fixed terminal or mobile terminal, each realized as a computer device. Examples of the user terminals 110, 120, 130 and 140 include a smart phone, a mobile phone, a navigation device, a computer, a laptop computer, a digital broadcasting terminal, a personal digital assistant (PDA), a portable multimedia player (PMP), and a tablet personal computer. For example, the user terminal 110 may communicate with the other user terminals 120, 130 and 140 and/or the server 150 through the network 170 by using a wireless or wired communication method.

The communication method is not limited, and may include not only a communication method using a communication network, such as a mobile communication network, a wired Internet, a wireless Internet, or a broadcasting network, which may be included in the network 170, but also a short-range wireless communication method between devices. For example, the network 170 may include at least one arbitrary network from among a personal area network (PAN), a local area network (LAN), a campus area network (CAN), a metropolitan area network (MAN), a wide area network (WAN), a broadband network (BBN), and the Internet. Also, the network 170 may include at least one of any type of network topology, such as a bus network, a star network, a ring network, a mesh network, a star-bus network, and a tree or hierarchical network, but is not limited thereto.

The server 150 may communicate with the plurality of user terminals 110, 120, 130 and 140 through the network 170 to be embodied as a computer device or a plurality of computer devices providing an instruction, a code, a file, content, or a service.

For example, the server 150 may provide a file for installing an application to the user terminal 110 connected through the network 170. In this case, the user terminal 110 may install the application by using the file provided from the server 150. Also, the user terminal 110 may receive a service or content provided by the server 150 by accessing the server 150 according to the control of an operating system (OS) or at least one program (for example, a browser or an installed application) included in the user terminal 110. For example, when the user terminal 110 transmits a service request message to the server 150 through the network 170 according to control of an application, the server 150 may transmit a code corresponding to the service request message to the user terminal 110, and the user terminal 110 may form and display a screen based on the code according to control by the application so as to provide content to a user. As another example, the server 150 may set a communication session for data exchange, and route data between the plurality of user terminals 110, 120, 130 and 140 through the set communication session.

Figure 2:
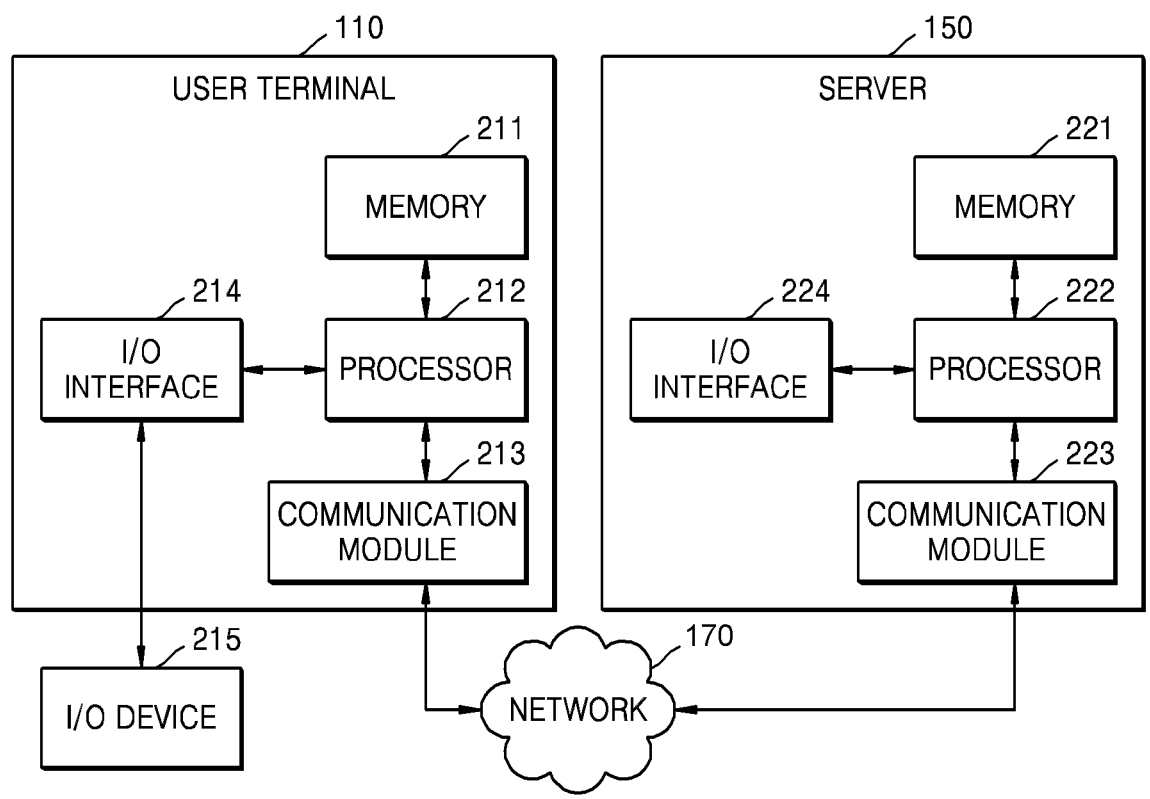
FIG. 2 is a block diagram of internal configurations of a user terminal and a server, according to an embodiment.

FIG. 2 is a block diagram of internal configurations of a user terminal and a server, according to an embodiment.

In FIG. 2, the user terminal 110 is described as an example of the user terminal and the server 150 is described as an example of the server. The other user terminals 120, 130, and 140 may also have the same or similar internal configurations.

The user terminal 110 and the server 150 may include memories 211 and 221, processors 212 and 222, communication modules 213 and 223, and input/output (I/O) interfaces 214 and 224. The memories 211 and 221 are non-transitory computer-readable recording media, and may include a permanent mass-storage device, such as a random access memory (RAM), a read-only memory (ROM), or a disk drive. Also, the memories 211 and 221 may store an operating system (OS) and at least one program code (for example, a code for a browser or an application as described above, which is installed in and driven by the user terminal 110). Such software components may be loaded from a computer-readable recording medium separate from the memories 211 and 221 by using a drive mechanism. Such a computer-readable recording medium may include a floppy drive, a disk, a tape, a DVD/CD-ROM drive, or a memory card. According to another embodiment, the software components may be loaded to the memories 221 and 221 through the communication modules 213 and 223 instead of from a computer-readable recording medium. For example, at least one program may be loaded to the memories 211 and 221 based on a program (for example, an application) installed by using files provided through the network 170 from a developer or a file distribution system (for example, the server 150) that distributes an installation file of the application.

The processors 212 and 222 may be configured to process an instruction of a computer program by performing basic arithmetic, logic, and I/O operations. The instruction may be provided to the processor 212 and 222 by the memories 211 and 221 or the communication modules 213 and 223. For example, the processors 212 and 222 may be configured to execute an instruction received according to a program code stored in recording media, such as the memories 211 and 221.

The communication modules 213 and 223 may provide a function for the user terminal 110 and the server 150 to communicate with each other through the network 170, and may provide a function for communicating with another user terminal (for example, the user terminal 120) or another server. For example, a request (for example, a streaming service request with respect to content) generated by the processor 212 of the user terminal 110 according to a program code stored in a recording device, such as the memory 211, may be transmitted to the server 150 through the network 170 according to control of the communication module 213. On the contrary, the communication module 213 of the user terminal 110 may receive a control signal, an instruction, content, or a file provided according to control by the processor 222 of the server 150, through the communication module 223 and the network 170. For example, a control signal or an instruction of the server 150 received through the communication module 213 may be transmitted to the processor 212 or the memory 211, and content or a file may be stored in a storage medium that may be further included in the user terminal 110.

The I/O interface 214 and 224 may be a unit for interfacing with an I/O device 215. For example, the I/O device 215 may include an input device that may be a keyboard or a mouse, and an output device that may be a display for displaying a communication session of an application. As another example, the I/O interface 214 may be a unit for interfacing with a device in which input and output functions are integrated, such as a touch screen. For example, while the processor 212 of the user terminal 110 processes an instruction of a computer program loaded to the memory 211, a service screen or content configured by using data provided by the server 150 or the user terminal 210 may be displayed through the I/O interface 214.

Also, according to another embodiment, the user terminal 110 and the server 150 may include more components than those shown in FIG. 2. Here, not all well-known components are necessarily detailed or wholly illustrated. For example, the user terminal 110 may include at least a part of the I/O device 215, or may further include another component, or components, such as a transceiver, a global positioning system (GPS) module, a camera, one of various sensors, or a database.

Figure 3:
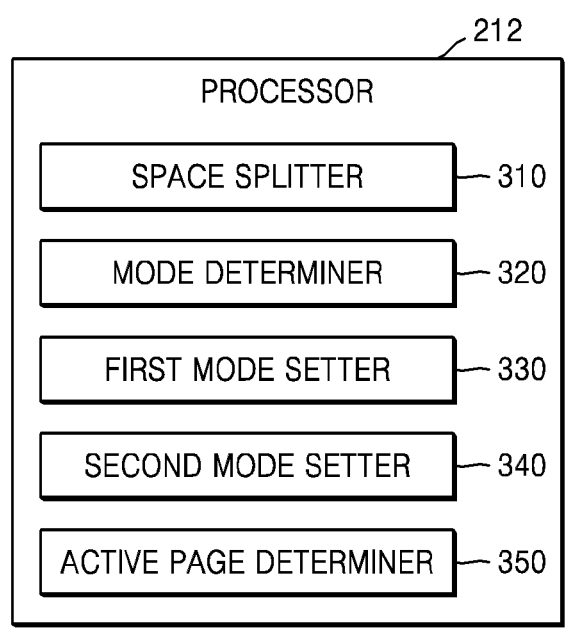
FIG. 3 is a block diagram of an internal configuration of a processor, according to an embodiment.

FIG. 3 is a block diagram of an internal configuration of the processor 212, according to an embodiment.

The processor 212 may include a web browser that may receive and output a web page online. The web browser according to an embodiment may be installed by being provided from an external source, for example, by being downloaded from a server or received from another device. A configuration for performing a function of the web browser in the processor 212, according to an embodiment, may include a space splitter 310, a mode determiner 320, a first mode setter 330, a second mode setter 340, and an active page determiner 350 as shown in FIG. 3. According to an embodiment, the components of the processor 212 may be selectively included in or excluded from the processor 212. Also, according to an embodiment, the components of the processor 212 may be divided further or integrated into other components to represent various functions of the processor 212.

Figure 4:
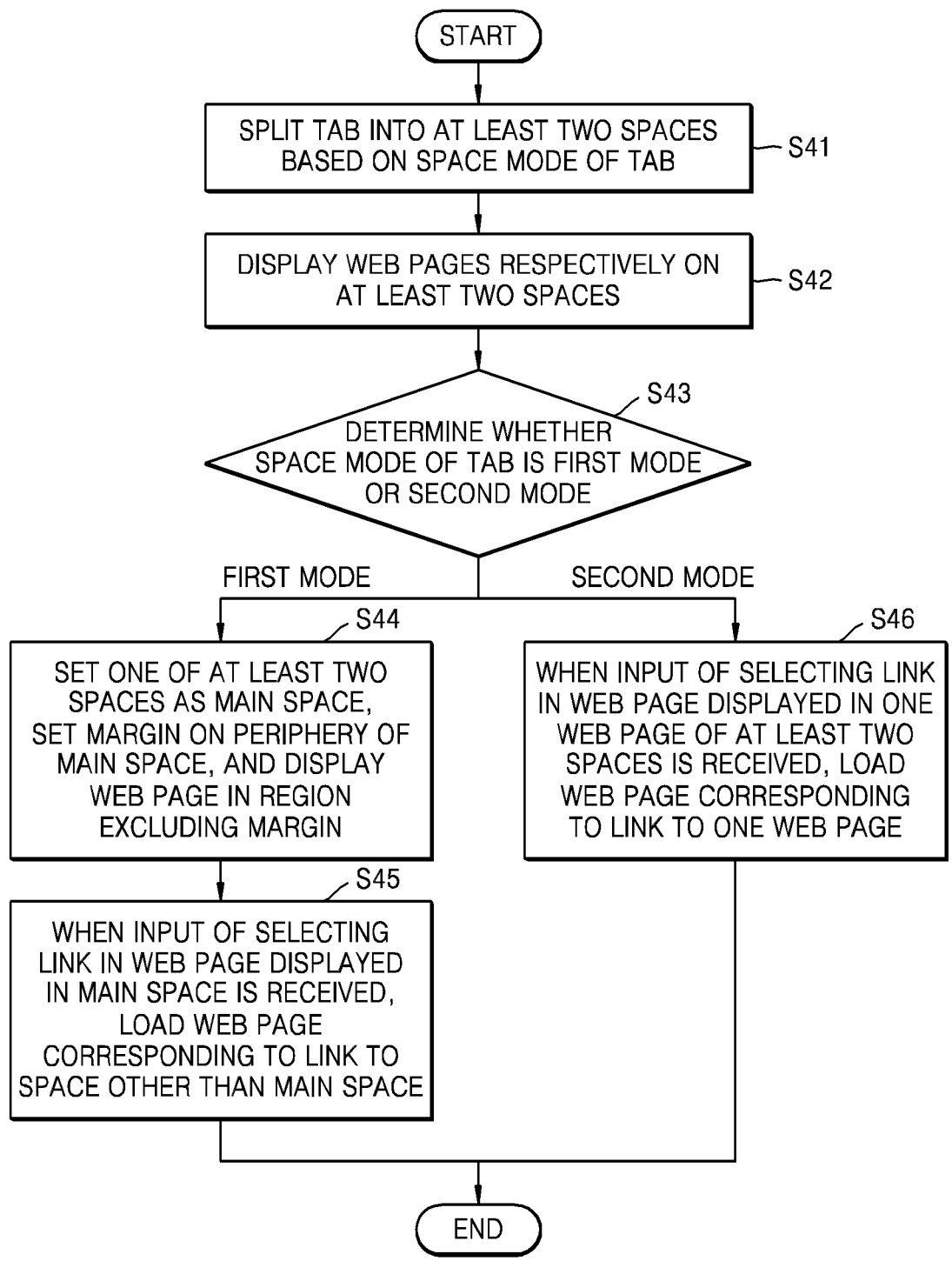
FIG. 4 is a flowchart of a method of providing a web browsing interface, according to an embodiment.

The processor 212 and the components of the processor 212 may control the user terminal 110 to perform operations (operations S41 to S46) of a method of providing a web browsing interface of FIG. 4. For example, the processor 212 and the components of the processor 212 may be embodied to execute an instruction according to at least one program code and a code of an OS (operating system) included in the memory 211.

Here, the components of the processor 212 may be representations of different functions of the processor 212, which are performed by the processor 212, according to instructions provided by program codes stored in the user terminal 110 (for example, instructions provided by a web browser driven by the user terminal 110).

FIG. 4 is a flowchart of a method of providing a web browsing interface, according to an embodiment.

First, in operation S41, the space splitter 310 splits a tab into at least two spaces, and displays web pages respectively on the at least two spaces, based on a space mode of the tab. The tab may mean a tab window. The tab may include a content display region displaying the web pages.

According to an embodiment, one or more tabs included in a web browser may each load and display one or more web pages. The one or more web pages loaded and displayed by each tab may be displayed in a content display region of the web browser. Also, the tab may have one or more spaces, wherein the space denotes a virtual space where a web page may be loaded. One web page may be loaded and displayed in one space.

According to an embodiment, the space mode of the tab may be a general mode or a split mode, and the split mode may be classified further into a connection mode and a separation mode. When the space mode of the tab is the general mode, the tab may have one space and only one page may be loaded and displayed in the one space. When the space mode of the tab is the split mode, the space splitter 310 may split the tab into at least two spaces, and load and display different web pages in the at least two spaces.

Meanwhile, when a plurality of web pages are respectively displayed in a plurality of spaces, the space splitter 310 may process a scroll bar of the web pages to be translucent and overlay the scroll bar on the web pages. Also, when a user input to manipulate the scroll bar, for example, a pointer that is held over the scroll bar, is received, the scroll bar may be enlarged and/or the transparency of the scroll bar may be decreased such that the scroll bar is more easily recognized by the user.

Then, in operation S43, while the tab is split into the at least two spaces, the mode determiner 320 may determine whether the space mode of the tab is a first mode or a second mode. According to an embodiment, the first mode may be the connection mode and the second mode may be the separation mode. As described above, the space mode of the tab may be the split mode, and the split mode may be classified into the connection mode and the separation mode. In this case, the mode determiner 320 may determine whether a space mode of a current tab is the connection mode or the separation mode.

According to an embodiment, the space mode may be set based on a user input or a pre-set value of the web browser. For example, the user may change the space mode from the general mode to the split mode by selecting a 'screen split' button from a tool bar of the web browser. Alternatively, the user may change the space mode from the general mode to the split mode by selecting 'open link in new space' from a menu displayed when a particular link displayed on the web browser is selected via a right-click of a mouse, and load a web page corresponding to the particular link in a new space. Also, the space mode may be switched between the connection mode and the separation mode in the split mode according to a user input or a pre-set value of the web browser. For example, the user may change the space mode to the connection mode by selecting a 'connect windows' button from the web browser, or the user may change to the separation mode by selecting a 'separate windows' button.

Then, when the space mode is determined to be the first mode (connection mode) in operation S43, the first mode setter 330 sets one of the at least two spaces as a main space, sets a margin on a periphery of the main space, and displays a web page in a region of the main space excluding the margin, in operation S44. In other words, the first mode setter 330 may display the margin around the web page displayed in the main space.

Then, in operation S45, when an input of selecting a link in the web page displayed in the main space is received, the first mode setter 330 loads a web page corresponding to the link in a space other than the main space. In other words, when the link in the web page displayed in the main space is selected in the connection mode, the web page of the link may be loaded and displayed in the other space. According to an embodiment, when the user selects a link in a web page displayed in a space in the connection mode, a web page of the selected link is loaded and displayed in another web page, and thus web browsing may be conveniently performed.

Meanwhile, when the space mode is determined to be the second mode (separation mode) in operation S43, and an input of selecting a link in the web page displayed in one of the at least two spaces is received, the second mode setter 340 may load a web page corresponding to the link in the one space in operation S46. In other words, according to an embodiment, when a link in a web page displayed in one space (such as the first space) is selected in the separation mode, a web page corresponding to the link may be loaded and displayed in that one space (such as the first space), and not in any another space (such as the second space or any additional spaces). In other words, in the separation mode, a web page corresponding to the link may be loaded and displayed in the same manner as an existing web browsing method, except that one tab includes at least two spaces when in the separation mode.

Then, although not illustrated in FIG. 4, the active page determiner 350 may determine an active page from among the web pages displayed respectively in the at least two spaces, and set an index of the tab or a URL emphasis mark based on information of the active page. Here, an active page denotes a web page that has received the most recent input from a user, from among a plurality of web pages displayed in a content display region. The most recent input of a user may denote any type of input from the user that is intended to perform an action on a web page, such as an input of selecting a particular link in the web page, an input of clicking a particular region of the web page, and an input to an input window of the web page.

Each of the web pages displayed in the respective spaces may include information displayed in an index of a tab or URL information while being loaded in a web browser. For example, while loading a web page of 'aaa.com', the web browser may obtain information displayed in the index or information indicated in the URL. Accordingly, when the web page of 'aaa.com' is loaded, 'portal aaa' may be displayed in the index and 'aaa.com' may be displayed in a URL display window. According to an embodiment, when a tab includes a plurality of spaces, since a plurality of web pages are displayed in a web browser, a user may recognize which web page is currently activated through an index of the tab or an emphasis mark on a URL display window. For example, when web pages of 'aaa.com' and 'bbb.com' are displayed respectively in spaces of one tab, and an active page is 'aaa.com', 'portal aaa' may be displayed in an index of the tab, and 'aaa.com' and 'bbb.com' are displayed in a URL display window while a URL emphasis mark is added to 'aaa.com'. The URL emphasis mark may be bold lettering of the URL, varying colors, or a border added around a URL.

Also, according to an embodiment, when a space mode of a tab is a separation mode, the active page determiner 350 may determine an active page and add an active mark outside a space including the active page. Here, the active mark outside the space may be a shadow effect given to the outside of the space. Accordingly, the user will be able to determine which one of the web pages is the currently activated page.

Figure 5:
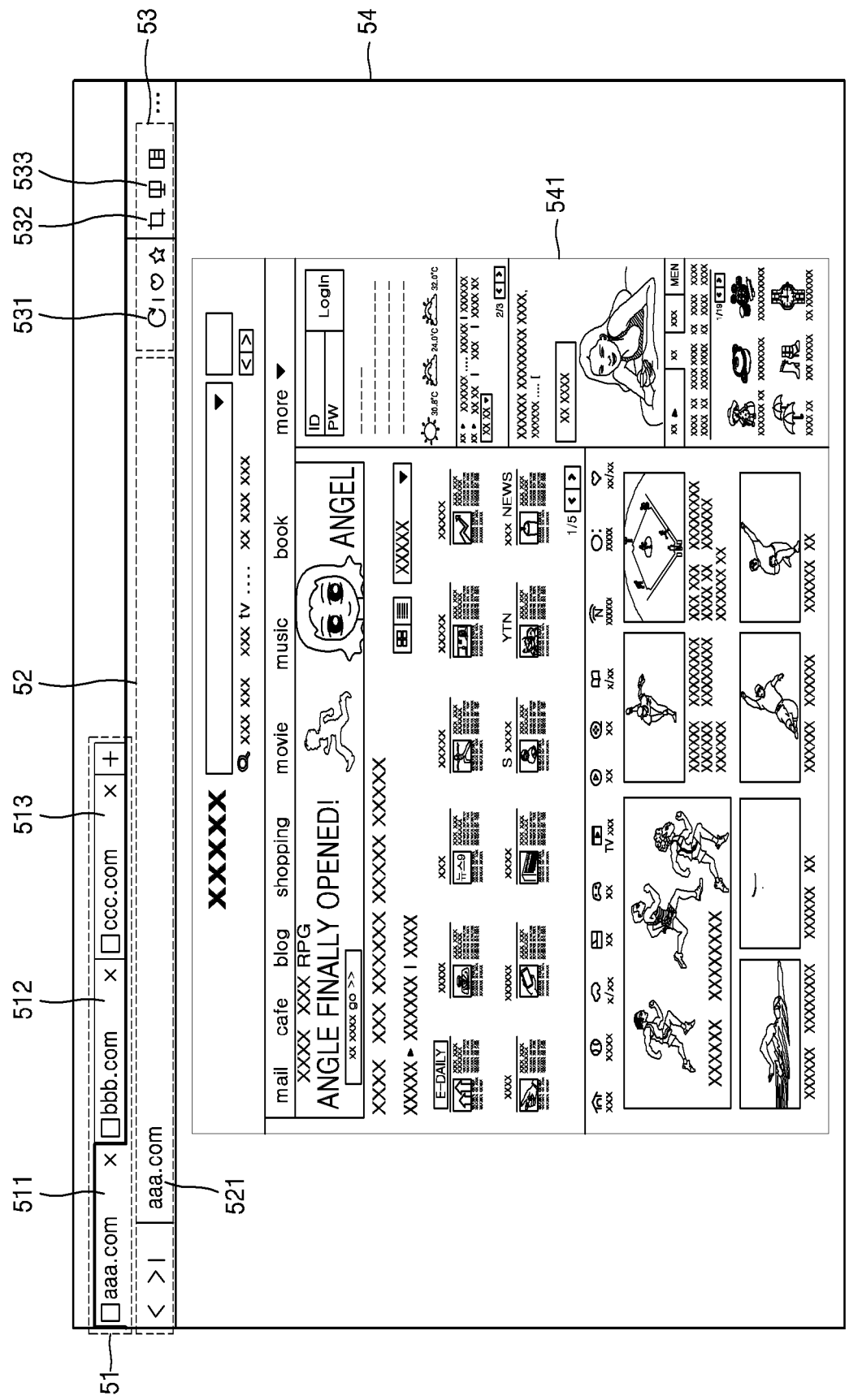
FIG. 5 illustrates an example of a graphical user interface (GUI) of a web browser according to an embodiment.

FIG. 5 illustrates an example of a graphical user interface (GUI) of a web browser according to an embodiment.

In FIG. 5, the GUI of the web browser according to an embodiment is displayed on a user terminal. The GUI of the web browser may include a tab index display region 51, a URL display region 52, a tool bar display region 53, and a content display region 54. The GUI of the web browser in FIG. 5 is only an example, and another component may be added to the web browser or a component of the web browser may be removed as long as the core concept of the present disclosure is maintained.

The tab index display region 51 may provide indexes for distinguishing between tabs loaded in a web browser. The web browser according to an embodiment may provide a tab browsing function. Tab browsing denotes that one web browser generates at least one tab and a web page may be browsed through each tab. Here, when a user selects an index of a tab desired to be displayed from the tab index display region 51, the tab is displayed in the content display region 54. In FIG. 5, an index 511 of a first tab is selected according to an embodiment.

In the embodiment of FIG. 5, the tab index display region 51 includes indexes 511 through 513 of first through third tabs, wherein the indexes 511 through 513 may display titles of web pages respectively loaded in the first through third tabs, or titles of active pages from among web pages loaded in the first through third tabs. For example, in the embodiment of FIG. 5, the index 511 is activated, and a title of a web page 541 of the index 511 is displayed in the index 511.

Then, a URL of a currently activated tab may be displayed in the URL display region 52. The URL of the currently activated tab is a URL of a web page loaded and displayed in the currently activated tab. In the embodiment of FIG. 5, the URL display region 52 displays 'aaa.com' 521, which is a URL of the first tab.

The tool bar display region 53 is a region where icons of tools for manipulating the web browser are displayed. Various icons of tools for realizing various functions of the web browser may be provided in addition to those of the tool bar display region 53 of FIG. 5. In the embodiment of FIG. 5, icons for realizing functions of the web browser may be provided in addition to a reload icon 531, a capture icon 532, and a split mode icon 533. According to an embodiment, the user may select the split mode icon 533 to split an activated tab into at least two spaces. In other words, when the split mode icon 533 is selected, a space mode of a tab may be changed from a general mode to a split mode. For example, when a tab includes only one space as shown in FIG. 5, the user may select the split mode icon 533 such that the tab is split to have at least two spaces. The split mode icon 533 may act as a toggle key, and when the split mode icon 533 is selected in the split mode, the space mode may be changed to the general mode.

The content display region 54 may display content of an activated tab. Content of an activated tab may be a web page loaded and displayed via the activated tab. In the embodiment of FIG. 5, a space mode of the first tab that is activated is a general mode, and the web page 541 is displayed in one space.

Figure 6A:
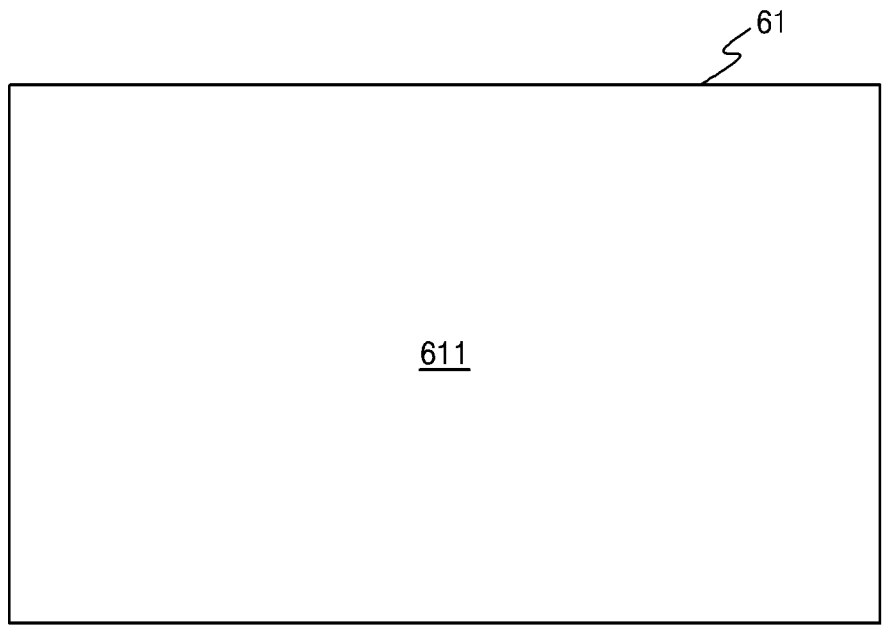
FIGS. 6A through 6C illustrate examples of tabs according to space modes, according to an embodiment.
Figure 6B:
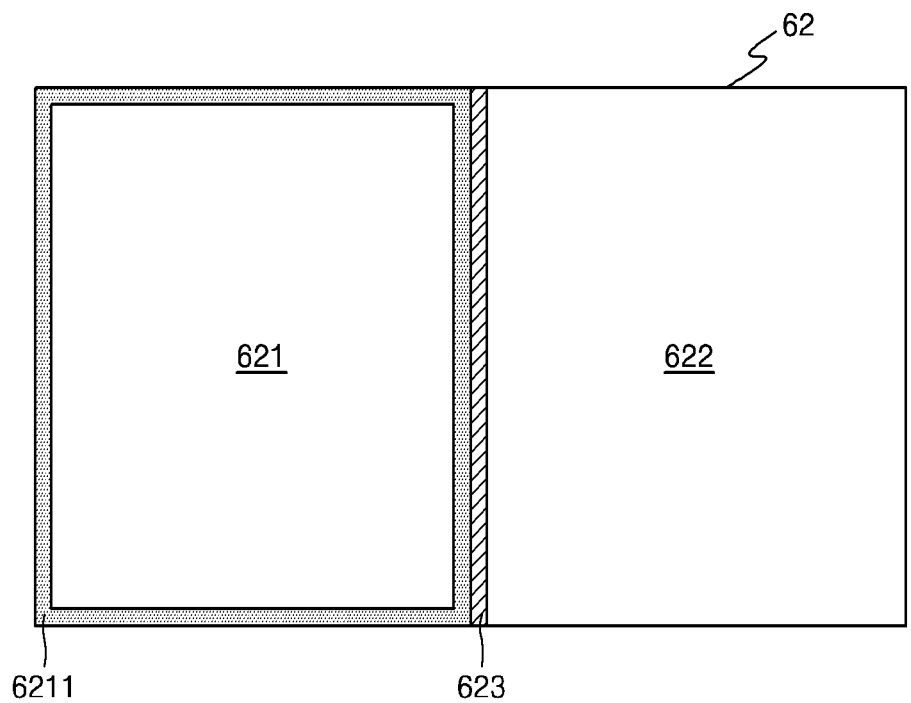
Figure 6C:
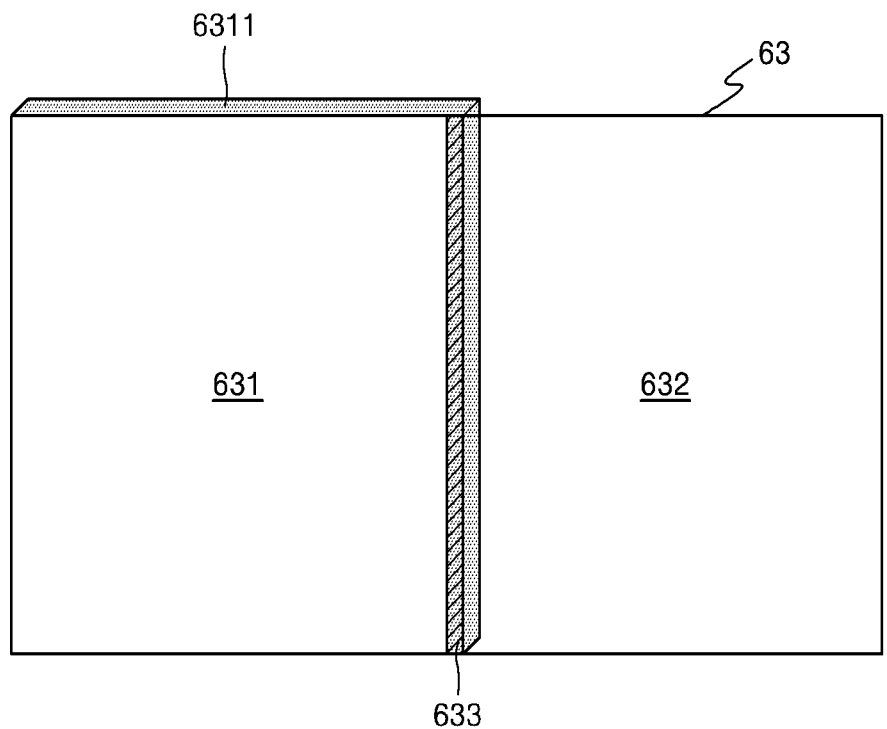

FIGS. 6A through 6C illustrate examples of tabs 61 through 63 according to space modes, according to an embodiment.

The tabs 61 through 63 of FIGS. 6A through 6C may be displayed in the content display region 54 of FIG. 5.

FIG. 6A illustrates an example of the tab 61 when the space mode is a general mode. The tab 61 includes only one space 611, and only one web page is displayed in the space 611.

FIG. 6B illustrates an example of the tab 62 when the space mode is a split mode, and the selected type of split mode is a connection mode. The tab 62 is split into two spaces, i.e., a first space 621 and a second space 622, and a dividing line 623 divides the first and second spaces 621 and 622. A web page may be displayed in each of the first and second spaces 621 and 622. According to an embodiment, one of a plurality of spaces may be set as a main space, and a margin may be set in a periphery of the main space. When the margin is set, a user may clearly recognize which space is the main space.

Also, a web page may be displayed in a region of the main space excluding the margin. According to an embodiment, the main space may be set to be the left space. In the example of FIG. 6B, the first space 621 is set as a main space, and a margin 6211 is set in a periphery of the first space 621. As described above, when a link in a web page displayed in the first space 621 is selected, a web page corresponding to the link may be displayed in the second space 622.

FIG. 6C illustrates an example of the tab 63 when the space mode is a split mode, and the selected type of split mode is a separation mode. The tab 63 is split into at least two spaces, i.e., a first space 631 and a second space 632, and a dividing line 633 divides the first and second spaces 631 and 632. A web page may be displayed in each of the first and second spaces 631 and 632. According to an embodiment, unlike the connection mode, a main space is not set in the separation mode, but a plurality of spaces may individually operate. In other words, when a link in a web page displayed in the first space 631 is selected in the separation mode, a web page corresponding to the link may be displayed in the first space 631. Meanwhile, in the separation mode, an active mark may be set with respect to a space including an active page. In the embodiment of FIG. 6C, when the first space 631 displays an active page, a shadow effect is set as an active mark 6311 at the edges of the first space 631. The active mark 6311 may be set in various ways other than the example shown in FIG. 6C.

Figure 7:
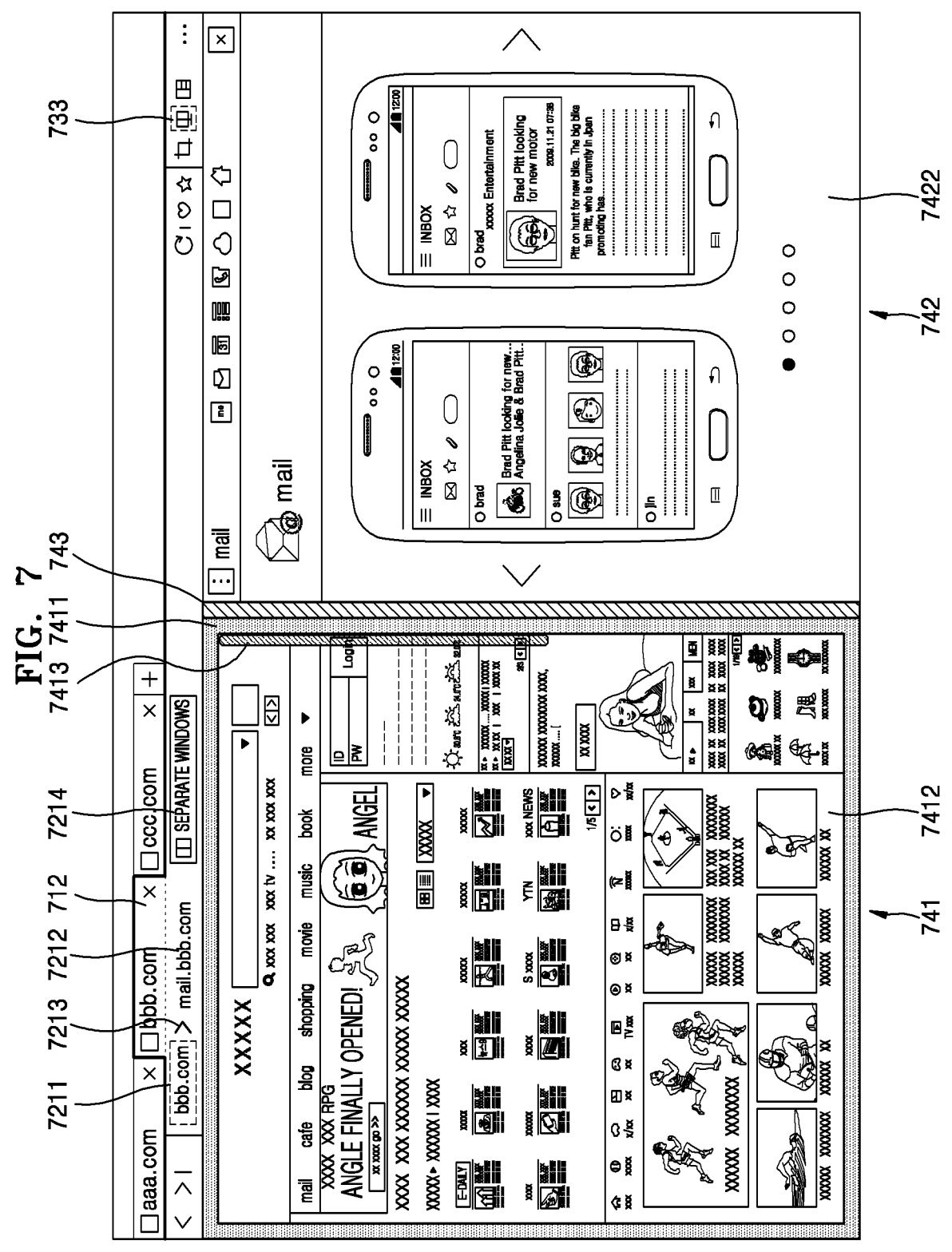

FIG. 7 illustrates an example of a GUI of a web browser according to an embodiment.

Figure 8:
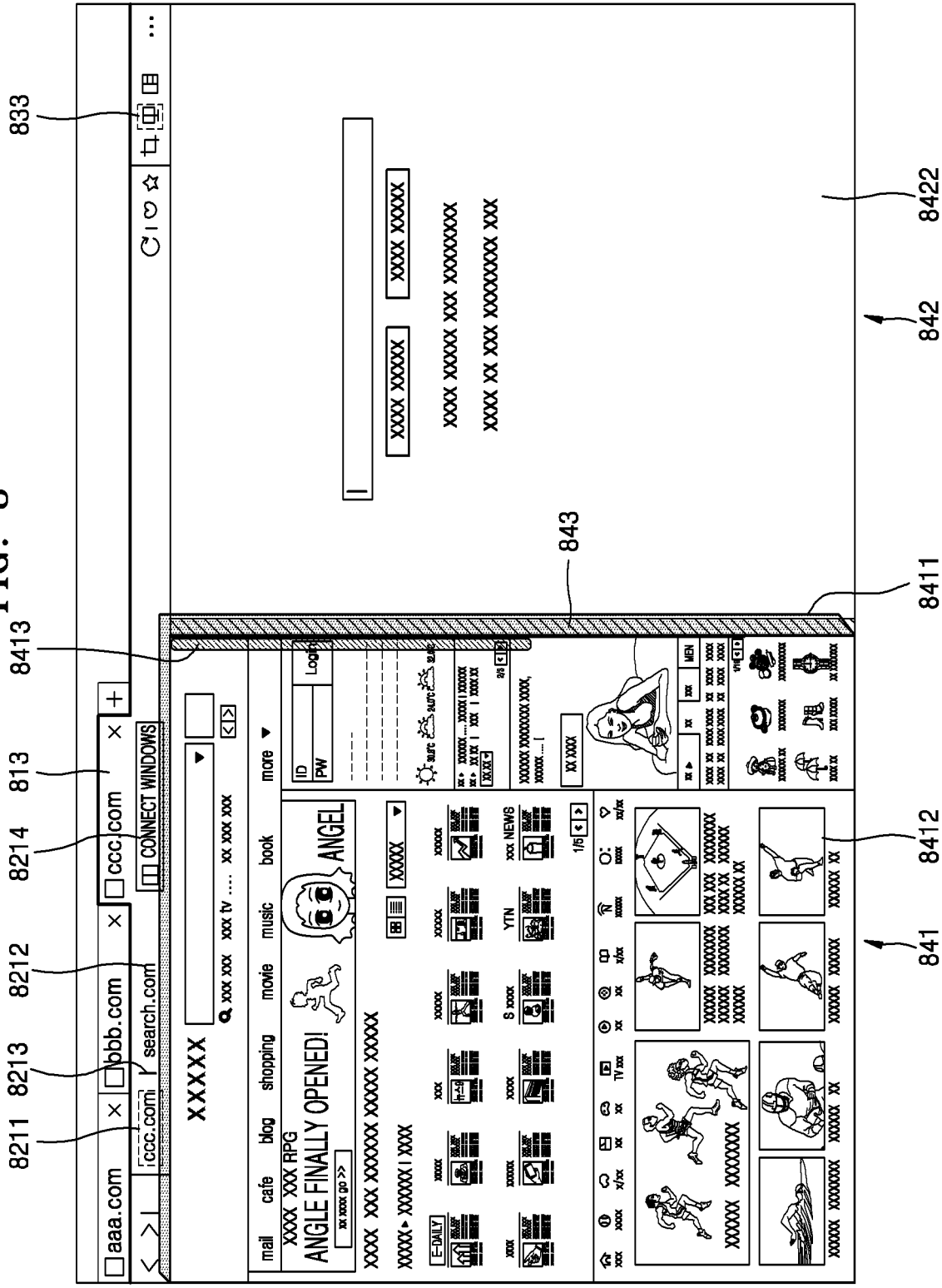

FIG. 7 illustrates a web browser where a space mode of a selected tab is a split mode, and the type of split mode selected is a connection mode. In the embodiment of FIG. 7, an index 712 of a second tab is selected from a tab index display region, wherein a space mode of the second tab is a split mode and a connection mode. Since the space mode of the second tab is the split mode, a URL 7211 of a web page displayed in a first space 741 and a URL 7212 of a web page displayed in a second space 742 are displayed together, and a delimiter 7213 (such as the greater than sign, '>') dividing the URLs 7211 and 7212 may be displayed in a URL display region. Here, a shape of the delimiter 7213 may vary based on whether the space mode is the connection mode or the separation mode. For example, in the connection mode, the delimiter 7213 may have a shape of '>' as shown in FIG. 7, and as mentioned above, and in the separation mode, the delimiter 7213 may have a shape of '|' as shown in FIG. 8 and as described below.

Also, a separation button 7214 may be displayed in the URL display region of FIG. 7. The separation button 7214 may be a toggle key which, when selected by a user, changes the space mode from the connection mode to the separation mode or from the separation mode to the connection mode. For example, as shown in FIG. 7, when the space mode is the connection mode, the user may select the separation button 7214 to change the space mode to the separation mode. In order to indicate that the space mode may be changed to the separation mode, a guide expression such as 'separate windows' may be included in the separation button 7214. Also, since the second tab selected in FIG. 7 is in the split mode, an indication that a split mode icon 733 is activated may be provided in a tool bar display region.

The first and second spaces 741 and 742 of the second tab are displayed in a content display region of FIG. 7, and a first web page 7412 is displayed in the first space 741 and a second web page 7422 is displayed in the second space 742. The first and second spaces 741 and 742 may be divided by a dividing line 743, and the user may adjust the sizes of the first and second spaces 741 and 742 by adjusting the location of the dividing line 743. Similar to that shown in FIG. 6B, FIG. 7 shows that when the space mode is the connection mode, a margin 7411 is displayed in a periphery of the first space 741, i.e., a main space, and the first web page 7412 may be displayed in a region of the first space 741 excluding the margin 7411.

Also, a scroll bar 7413 processed to be translucent may be included in the first web page 7412 and/or the second web page 7422 to overlay the first web page 7412 and/or the second web page 7422. In FIG. 7, the scroll bar 7413 is illustrated only on the right of the first web page 7412, but the scroll bar 7413 may also exist on the bottom of the first web page 7412 if required. When a content display region of a web browser is split into at least two spaces to display web pages, areas for displaying the web pages are decreased. Accordingly, a web browser according to an embodiment does not assign a separate area for a scroll bar, but instead overlays a translucent scroll bar on a web page.

As shown in FIG. 7, when the space mode of the second tab that is selected is the split mode and the connection mode, and an input of selecting a link in the first web page 7412 displayed in the first space 741 that is the main space is received, a web page corresponding to the link may be loaded in the second space 742, wherein the second space 742 is completely outside of the first space 741. In the embodiment of FIG. 7, when the user selects a 'mail' link in the first web page 7412, the second web page 7422 shown in FIG. 7 is loaded. The user may determine that a left space, i.e., the first space 741, is the main space through indication of the margin 7411, and may select a link in the first web page 7412 displayed in the main space to load and display a web page corresponding to the link in a right space, i.e., the second space 742.

FIG. 8 illustrates an example of a GUI of a web browser according to another embodiment.

FIG. 8 illustrates a web browser where a space mode of a selected tab is a split mode, and the selected type of split mode is a separation mode. In the embodiment of FIG. 8, an index 813 of a third tab is selected from a tab index display region, wherein a space mode of the third tab is a split mode and a separation mode. Since the space mode of the third tab is the split mode, a URL 8211 of a web page displayed in a first space 841 and a URL 8212 of a web page displayed in a second space 842 are displayed together, and a delimiter 8213 (such as the "vertical line" or "pipe" symbol, '|') dividing the URLs 8211 and 8212 may be displayed in a URL display region. Any details of FIG. 8 that overlap with those of FIG. 7 will not be provided again below.

Also, a connection button 8214 may be displayed in the URL display region of FIG. 8. As shown in FIG. 8, when the space mode is the separation mode, the user may select the connection button 8214 to change the space mode to the connection mode. In order to indicate that the space mode may be changed to the connection mode, a guide expression 'connect windows' may be included in the connection button 8214. Also, since the third tab selected in FIG. 8 is in the split mode, an indication that a split mode icon 833 is activated may be provided in a tool bar display region.

The first and second spaces 841 and 842 of the third tab are displayed in a content display region of FIG. 8, and a first web page 8412 is displayed in the first space 841 and a second web page 8422 is displayed in the second space 842. The first and second spaces 841 and 842 may be divided by a dividing line 843, and the user may adjust the sizes of the first and second spaces 841 and 842 by adjusting the location of the dividing line 843. Similar to that shown in FIG. 6C, FIG. 8 shows that when the space mode is the separation mode, an active mark 8411 may be set around the first space 841 including an active page. Also, a scroll bar 8413 processed to be translucent may be included in the first web page 8412 to overlay the first web page 8412.

As shown in FIG. 8, when the space mode of the third tab that is selected is the split mode and the separation mode, a plurality of spaces may individually operate, unlike in the connection mode. In other words, even when a link in the first web page 8412 displayed in the first space 841 is selected, a web page corresponding to the link may be displayed in the first space 841 as the first web page 8412 (i.e., the web page shown in the first space 841 is replaced). Similarly, even when a link in the second web page 8422 displayed in the second space 842 is selected, a web page corresponding to the link may be displayed in the second space 842 as the second web page 8422 (i.e., the web page shown in the second space 842 is replaced).

Figure 9:
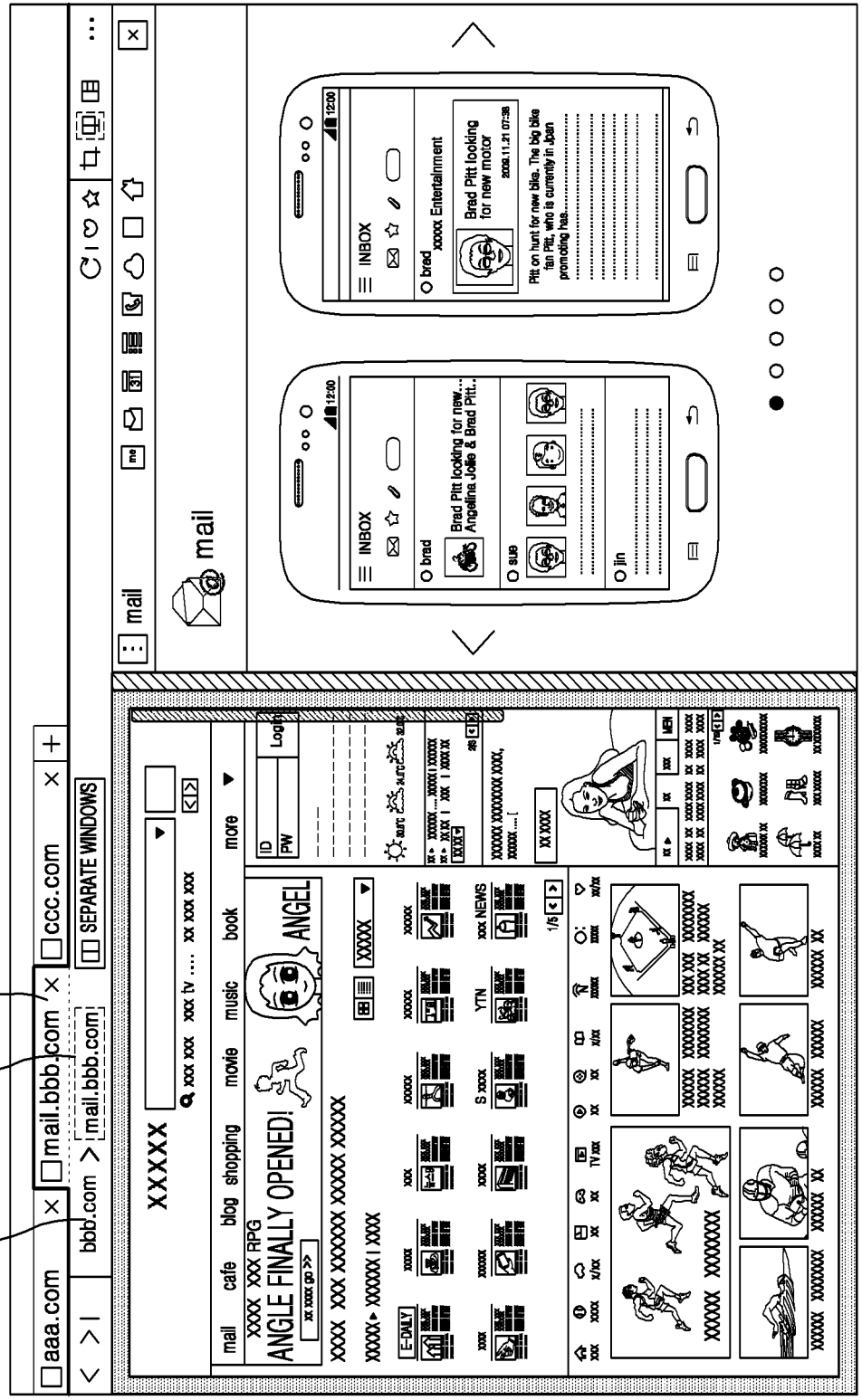

FIG. 9 illustrates an example of a GUI of a web browser according to another embodiment.

FIG. 9 is a modified example of FIG. 7, and any details and reference numerals overlapping with those of FIG. 7 may be omitted or briefly described. Differences between the web browsers of FIGS. 7 and 9 are that the active page of FIG. 7 is the first web page 7412 of the first space 741, whereas an active page of FIG. 9 is the second web page 7422 of the second space 742. In other words, in the embodiment of FIG. 7, a most recent input of the user is received from the first web page 7412, whereas in the embodiment of FIG. 9, a most recent input of the user is received from the second web page 7422. According to an embodiment, an index of a second tab and a URL emphasis mark may be set based on information of the active page. For example, in the embodiment of FIG. 7, a title ('bbb.com') of the first web page 7412 is displayed in the index 712, whereas in the embodiment of FIG. 9, a title ('mail.bbb.com') of the second web page 7422 is displayed in an index 912. Also, in the embodiment of FIG. 7, an emphasis mark is set on the URL 7211 ('bbb.com') of the first web page 7412, whereas in the embodiment of FIG. 9, an emphasis mark is set on a URL 9212 ('mail.bbb.com') of the second web page 7422. In the embodiments of FIGS. 7 and 9, the emphasis marks are set by adding dashed-line borders around the URLs 7211 and 9212. As can be seen when comparing FIG. 9 with FIG. 7, the margin 7411 (numbered in FIG. 7) remains around the first web page 7412 of the first space 741, even when the second web page 7422 of the second space 742 is the active page, to continue to indicate that the first space is still the main space.

Figure 10:
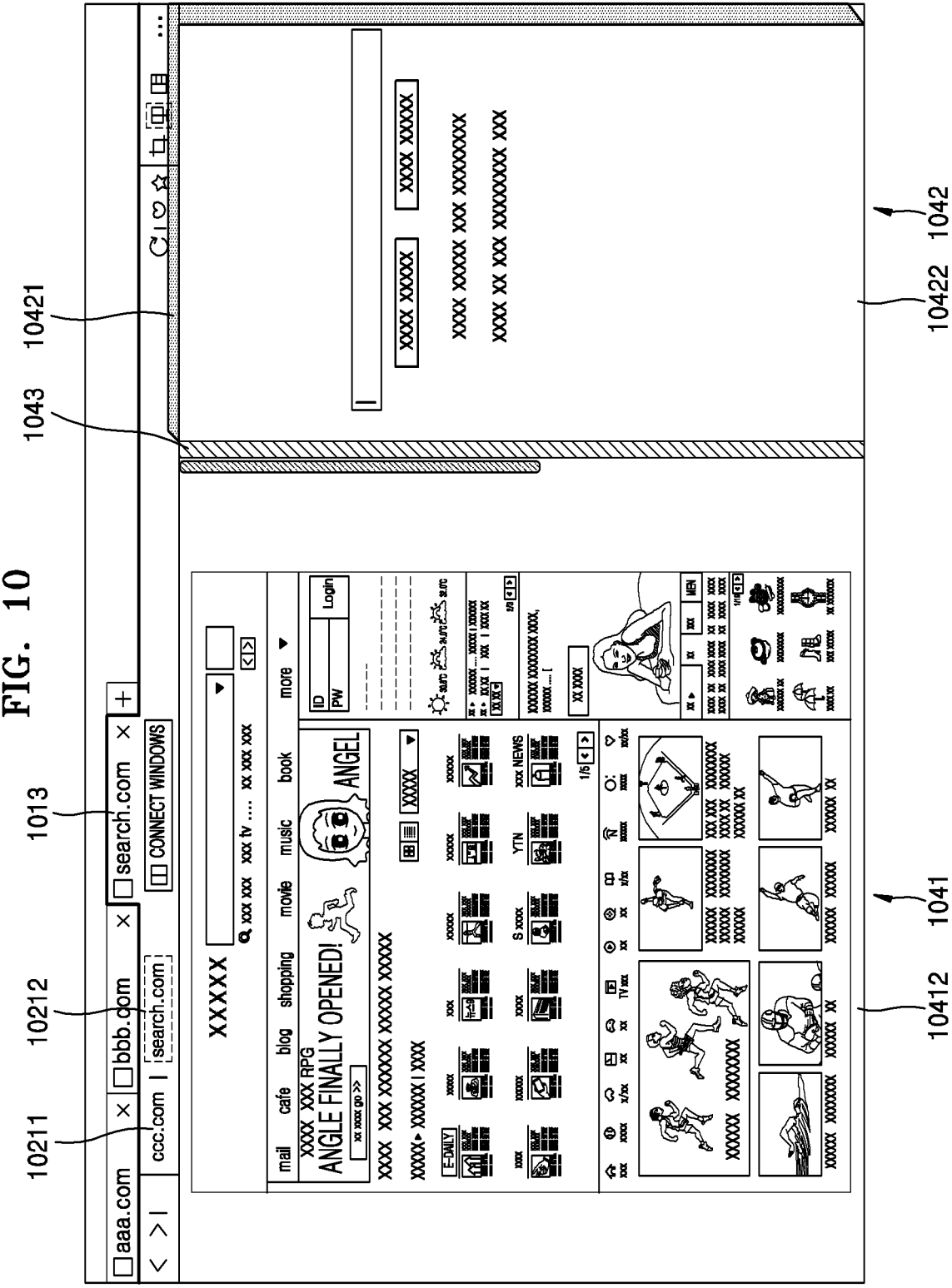

FIG. 10 illustrates an example of a GUI of a web browser according to another embodiment.

FIG. 10 is a modified example of FIG. 8, and any details and reference numerals overlapping with those of FIG. 8 may be omitted or briefly described. Differences between the web browsers of FIGS. 8 and 10 are that the active page of FIG. 8 is the first web page 8412 of the first space 841, whereas an active page of FIG. 10 is a second web page of a second space 1042, wherein a dividing line 1043 is more to the right than the dividing line 843 of FIG. 8. In other words, in the embodiment of FIG. 8, the first web page 8412 received a most recent input from the user, whereas in the embodiment of FIG. 10, the second web page received a most recent input from the user. For example, in the embodiment of FIG. 8, a web page title 'ccc.com' of the first web page 8412 is displayed in the index 813, whereas in the embodiment of FIG. 10, a web page title 'search.com' of the second web page is displayed on an index 1013. Also, in the embodiment of FIG. 8, an emphasis mark is set on the URL 8211, i.e., 'ccc.com', of the first web page 8412, whereas in the embodiment of FIG. 10, an emphasis mark is set on a URL 10212, i.e., 'search.com', of the second web page. Also, in the embodiment of FIG. 8, the active mark 8411 is set on the first space 841 including the active page, whereas in the embodiment of FIG. 10, an active mark 10421 is set on the second space 1042 including the active page.

Also, in comparison with FIG. 8, in the embodiment of FIG. 10, a size of a first space 1041 is larger and a size of the second space 1042 is smaller because the dividing line 1043 is more to the right than the dividing line 843 of FIG. 8. The user may move the dividing line 1043 from side to side to adjust the sizes of the first and second spaces 1041 and 1042. Here, when the sizes of the first and second spaces 1041 and 1042 are adjusted by moving the dividing line 1043, margins of first and second web pages displayed in the first and second spaces 1041 and 1042 may first be enlarged or reduced. For example, in the embodiment of FIG. 10, the side margins of the first web page displayed in the first space 1041 are enlarged (as indicated by the additional white space around the first web page 10412 of FIG. 10 when compared to the first webpage 8412 of FIG. 8), whereas side margins of the second web page displayed in the second space 1042 are reduced (as indicated by the reduction of white space between second webpages 10422 (FIG. 10) and 8422 (FIG. 8)) such that contents of the first and second web pages are displayed at the centers of the first and second spaces 1041 and 1042. In other words, when a size of a space is enlarged or reduced, a margin of a web page may be enlarged or reduced first such that even when the size of the space is adjusted, content of the web page is displayed on a web browser screen or is aligned at the center of the space.

Figure 11:
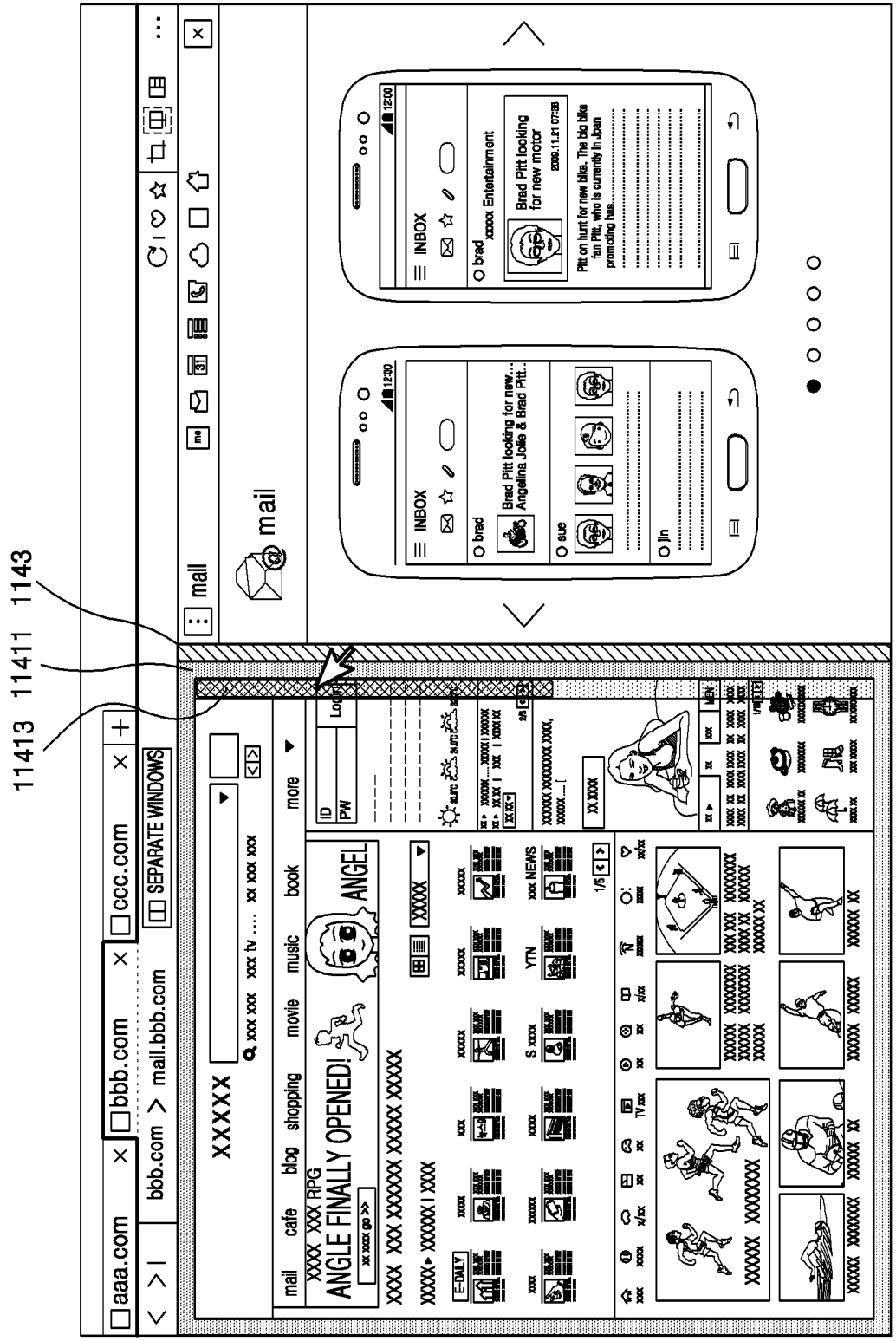

FIG. 11 illustrates an example of a GUI of a web browser according to another embodiment.

FIG. 11 is a modified example of FIG. 7, and any details and reference numerals overlapping with those of FIG. 7 may be omitted or briefly described. In the embodiment of FIG. 11, when a pointer is over a scroll bar 11413, the scroll bar 11413 is enlarged and/or transparency of the scroll bar 11413 is decreased, and a region in which the scroll bar 11413 is movable is also displayed. As described with reference to FIG. 7, according to an embodiment, a scroll bar may be processed to be translucent and overlaid on a web page in consideration of a content display region being reduced when a plurality of web pages are respectively displayed in spaces. Also, when a user is to manipulate the scroll bar, the scroll bar may be enlarged or transparency of the scroll bar may be reduced as shown in FIG. 11, such that the scroll bar is easily recognized by the user. In FIG. 11, the pointer is over the scroll bar 11413, but according to another embodiment, the scroll bar 11413 may be enlarged and/or the transparency of the scroll bar 11413 may be reduced with respect to all inputs of adjusting the location of the scroll bar 11413, such as when the user manipulates arrow keys of a keyboard. According to another embodiment, the transparency of the scroll bar 11413 may be set to 0 to set the scroll bar 11413 to be opaque.

According to an embodiment, in a web browsing interface for displaying web pages respectively in spaces, a user may recognize which of the spaces is the main space by considering how the margin in a periphery of the main space has been set by the web browser.

Also, according to an embodiment, an index of a tab or a URL emphasis mark may be set by the web browser based on information of an active page, or an active mark may be set by the web browser on a space including the active page, such that a user recognizes the active page.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be modified in various ways. Such modifications are not to be regarded as a departure from the disclosure, and all such modifications are intended to be included within the scope of the disclosure.

What is claimed is:

1. A method of providing a web browsing interface, wherein at least one tab is provided for a content display region, the method comprising:
    splitting the tab into at least two spaces based on a space mode of the tab;
    displaying web pages respectively in the at least two spaces;
    while the tab is split into the at least two spaces, determining whether the space mode of the tab is a first mode or a second mode, wherein the first mode or the second mode is set by a user input of selecting a button provided on a web browser;
    when the space mode is determined to be the first mode, performing a first mode setting operation of setting one of the at least two spaces as a main space, setting a margin on a periphery of the main space, and displaying a web page in a region of the main space excluding the margin,
    wherein, in the performing of the first mode setting operation, when an input of selecting a link in the web page displayed in the main space is received, a web page corresponding to the link is loaded in a space other than the main space, wherein the space other than the main space is completely outside of the main space, and
    when the space mode is determined to be the second mode and an input of selecting a link in a web page displayed in a particular space from among the at least two spaces is received, performing a second mode setting operation of loading a web page corresponding to the link in the particular space,
    wherein the determining whether the space mode of the tab is the first mode or the second mode is performed prior to the step of receiving the input of selecting the link in the web page, wherein the button is displayed in a display region provided outside of the margin, and further wherein the user's input via the button selects either the first mode for all of the spaces of the at least two spaces or the second mode for all of the spaces of the at least two spaces, wherein a first URL associated with the web page displayed in the main space and a second URL associated with the web page displayed in the space other than the main space are both displayed in a URL display region, and further wherein:
the first URL and the second URL are separated by a first delimiter when in the first mode;
the first URL and the second URL are separated by a second delimiter when in the second mode; and
the first delimiter is different from the second delimiter.

2. The method of claim 1, wherein, in the performing of the second mode setting operation, an active mark is provided to a space comprising an active page from among the at least two spaces.

3. The method of claim 2, wherein the active mark is a shadow effect set adjacent the space comprising the active page.

4. The method of claim 1, further comprising performing an active page determining operation of determining an active page from the web pages displayed respectively in the at least two spaces, and setting an index of a tab or a uniform resource locator (URL) emphasis mark based on information of the active page.

5. The method of claim 4, wherein, in the performing of the active page determining operation, a web page that received a most recent input from a user, from among the web pages displayed respectively in the at least two spaces, is set as the active page.

6. The method of claim 1, wherein the button for selecting the first mode or the second mode is a toggle key provided on the web browser.

7. The method of claim 1, wherein the displaying of the web pages comprises displaying a scroll bar processed to be translucent so as to overlay on the web pages displayed respectively in the at least two split spaces,
wherein the scroll bar is set to be enlarged or is set such that transparency is decreased when a user input is detected with respect to the scroll bar.

8. The method of claim 1, wherein the displaying of the web pages comprises:
displaying, between the at least two spaces, a dividing line whose location is adjusted according to a user input; and
when a size of a particular space is decreased by adjusting the dividing line, decreasing a margin of a web page displayed in the particular space before hiding in part content of the web page.

9. A computer program stored in a non-transitory computer-readable recording medium to execute the method of claim 1.

10. The method of claim 1, wherein the first delimiter comprises a greater than sign and the second delimiter comprises a vertical line.

11. An apparatus for providing a web browsing interface, wherein one of at least one tab is provided for a content display region, the apparatus comprising:

a processor having a plurality of functional units for performing a plurality of corresponding functions, the functional units including:
a space splitter configured to split the tab into at least two spaces based on a space mode of the tab, and to display web pages respectively in the at least two spaces;
a mode determiner configured to, while the tab is split into the at least two spaces, determine whether the space mode of the tab is a first mode or a second mode based on a user input received from a button provided on a web browser; a first mode setter configured to, when the space mode is determined to be the first mode, set one of the at least two spaces as a main space, set a margin on a periphery of the main space, and display a web page in a region of the main space excluding the margin, when an input of selecting a link in the web page displayed in the main space is received, the first mode setter is further configured to load a web page corresponding to the link in a space other than the main space, wherein the space other than the main space is completely outside of the main space, and
a second mode setter configured to, when the space mode is determined to be the second mode and an input of selecting a link in a web page displayed in a particular space from among the at least two spaces is received, load a web page corresponding to the link in the particular space,
wherein the mode determiner determines whether the space mode of the tab is the first mode or the second mode before the step of receiving the input of selecting the link in the web page,
wherein the button is displayed in a display region provided outside of the margin, and further wherein the user's input via the button selects either the first mode for all of the spaces of the at least two spaces or the second mode for all of the spaces of the at least two spaces,
wherein a first URL associated with the web page displayed in the main space and a second URL associated with the web page displayed in the space other than the main space are both displayed in a URL display region, and
further wherein:
the first URL and the second URL are separated by a first delimiter when in the first mode;
the first URL and the second URL are separated by a second delimiter when in the second mode; and
the first delimiter is different from the second delimiter.

12. The apparatus of claim 11, wherein the second mode setter is further configured to provide an active mark to a space comprising an active page from among the at least two spaces.

13. The apparatus of claim 11, further comprising an active page determiner configured to determine an active page from the web pages displayed respectively in the at least two spaces, and set an index of a tab or a uniform resource locator (URL) emphasis mark based on information of the active page.

14. The apparatus of claim 11, wherein the button for selecting the first mode or the second mode is a toggle key provided on the web browser.

15. The apparatus of claim 11, wherein the first delimiter comprises a greater than sign and the second delimiter comprises a vertical line.

* * * * *